United States Patent
Harmke et al.

(10) Patent No.: US 10,779,067 B2
(45) Date of Patent: Sep. 15, 2020

(54) SYSTEMS FOR REDUCING WIND-INDUCED NOISE AND WATER INFILTRATION IN COMMUNICATION DEVICES

(71) Applicant: MOTOROLA SOLUTIONS, INC., Chicago, IL (US)

(72) Inventors: Charles B. Harmke, Huntley, IL (US); Oleg G. Harizanov, Hoffman Estates, IL (US); Geng Xiang Lee, Penang (MY); Kuang Eng Lim, Penang (MY); Michael Page, Miami, FL (US); William Robertson, Pompano Beach, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 11 days.

(21) Appl. No.: 16/227,416

(22) Filed: Dec. 20, 2018

(65) Prior Publication Data
US 2020/0204894 A1 Jun. 25, 2020

(51) Int. Cl.
*H04R 1/02* (2006.01)
*H04R 1/04* (2006.01)
*H04R 1/08* (2006.01)

(52) U.S. Cl.
CPC .............. *H04R 1/04* (2013.01); *H04R 1/086* (2013.01); *H04R 2410/07* (2013.01)

(58) Field of Classification Search
CPC .... H04R 1/023; H04R 1/086; H04R 2410/07; Y10T 29/4962
See application file for complete search history.

(56) References Cited

U.S. PATENT DOCUMENTS

| | | | | |
|---|---|---|---|---|
| 2,520,222 A | * | 8/1950 | Stone | H04R 1/023 428/138 |
| 3,306,990 A | * | 2/1967 | Walker | H04R 1/023 381/365 |

(Continued)

FOREIGN PATENT DOCUMENTS

| | | |
|---|---|---|
| EP | 2600634 | 6/2013 |
| GB | 2539323 A | 12/2016 |

(Continued)

OTHER PUBLICATIONS

International Search Report and Written Opinion dated Feb. 21, 2020 for corresponding International Application No. PCT/US2019/063398 (16 pages).

*Primary Examiner* — Fan S Tsang
*Assistant Examiner* — Ryan Robinson
(74) *Attorney, Agent, or Firm* — Michael Best & Friedrich LLP

(57) ABSTRACT

A grille configured for shielding a microphone cavity. The grille includes a first side. The first side includes a first plurality of parallel slats defining a first plurality of channels extending along a first direction. The grille includes a second side opposite the first side. The second side includes a second plurality of parallel slats defining a second plurality of channels extending along a second direction at a first angle relative to the first direction. The first plurality of parallel slats and the second plurality of parallel slats define a lattice having a plurality of openings extending through the grille. The openings are configured to diffuse air moving across the lattice. The channels and slats are configured to induce capillary action on water coming in contact with the lattice to drain water from the openings and the microphone cavity.

19 Claims, 15 Drawing Sheets

(56) References Cited

U.S. PATENT DOCUMENTS

| | | | | |
|---|---|---|---|---|
| 3,880,253 A * | 4/1975 | Kuhfus | ............ | G10K 13/00 |
| | | | | 181/175 |
| 3,938,618 A * | 2/1976 | Ambruoso, Sr. | ...... | H04R 1/023 |
| | | | | 181/155 |
| 3,989,909 A * | 11/1976 | Hodsdon | ............ | H04R 1/023 |
| | | | | 381/391 |
| 3,995,125 A * | 11/1976 | Cypser | ............ | H04R 1/023 |
| | | | | 381/391 |
| 6,004,122 A * | 12/1999 | Terajima | ............ | B29C 43/021 |
| | | | | 264/257 |
| 7,668,332 B2 * | 2/2010 | Williams | ............ | H04R 1/023 |
| | | | | 381/360 |
| 7,840,021 B2 * | 11/2010 | Greco | ............ | H04R 1/023 |
| | | | | 181/175 |
| 8,009,851 B2 * | 8/2011 | De Pooter | ............ | H04R 1/086 |
| | | | | 381/355 |
| 8,638,973 B2 * | 1/2014 | Hayashi | ............ | H04R 1/023 |
| | | | | 381/189 |
| 8,712,091 B2 * | 4/2014 | Taylor | ............ | H04R 1/023 |
| | | | | 381/391 |
| 9,510,071 B2 * | 11/2016 | Jones | ............ | H04R 1/023 |
| 9,681,210 B1 * | 6/2017 | Lippert | ............ | G10K 11/18 |
| 9,804,053 B2 * | 10/2017 | Takahashi | ............ | G01M 3/243 |
| 9,877,097 B2 * | 1/2018 | Saw | ............ | H04R 1/086 |
| 10,356,497 B1 * | 7/2019 | Brown | ............ | H04R 1/023 |
| 2011/0103634 A1 | 5/2011 | Maddern et al. | | |

FOREIGN PATENT DOCUMENTS

| | | |
|---|---|---|
| JP | 2008-061768 A | 3/2008 |
| WO | 2015015646 A1 | 2/2015 |

\* cited by examiner

SYSTEMS FOR REDUCING WIND-INDUCED NOISE AND WATER INFILTRATION IN COMMUNICATION DEVICES

BACKGROUND OF THE INVENTION

Emergency personnel and law enforcement officers rely on radio communication equipment in order to perform their duties. Remote speaker microphones are commonly used in connection with radios and other communication devices to improve sensing of speech and output of audio.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
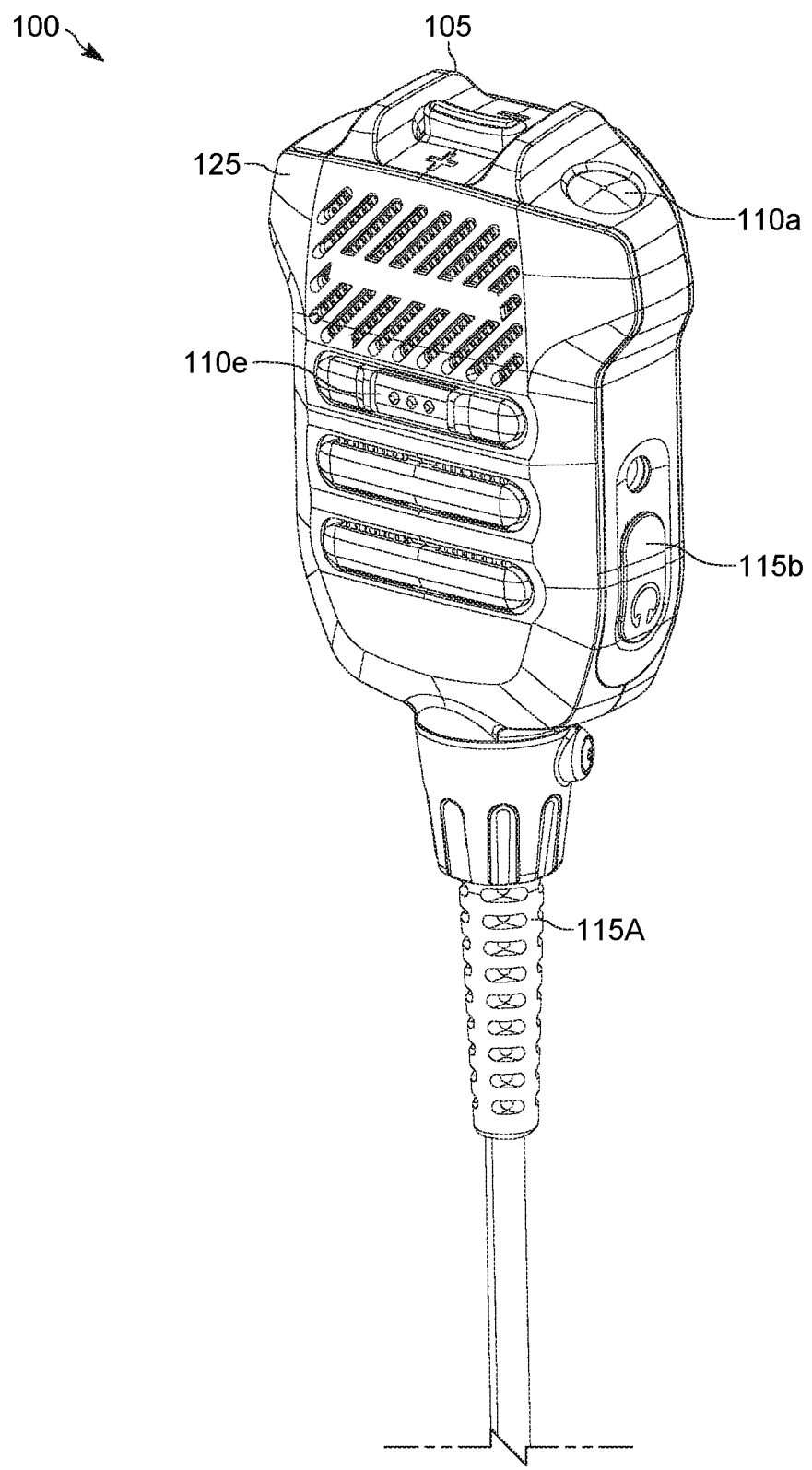
FIG. 1A is a front perspective view of a remote speaker microphone in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Remote speaker microphones are commonly used by public safety and other emergency personnel to improve portability and speech intelligibility in radio communications. Remote speaker microphones are typically worn on the outside of a user's clothing, and are therefore exposed to the elements. Some currently existing remote speaker microphones may exhibit decreased performance in windy or wet environments. For example, wind blowing on a remote speaker microphone causes noise, which can overwhelm a microphone or microphone array, resulting in unintelligible speech. In another example, water (for example, from rain, snow, firefighting operations, and the like) may infiltrate the microphone cavity, attenuating the sounds picked up by the microphone. Accordingly, embodiments presented herein provide systems for reducing wind-induced noise and water infiltration in communication devices, including remote speaker microphones.

One embodiment includes a grille configured for shielding a microphone cavity. The grille includes a first side having a first plurality of parallel slats defining a first plurality of channels extending along a first direction. The grille includes a second side, opposite the first side, having a second plurality of parallel slats defining a second plurality of channels extending along a second direction at a first angle relative to the first direction. The first plurality of parallel slats and the second plurality of parallel slats define a lattice having a plurality of openings extending through the grille.

Another embodiment includes a remote speaker microphone housing. The housing includes a microphone cavity. The housing includes a drainage cavity in fluid communication with the microphone cavity and the exterior of the remote speaker microphone housing. The housing includes a lattice positioned over the microphone cavity. The lattice includes a first side having a first plurality of parallel slats defining a first plurality of channels extending along a first direction. The lattice includes a second side, opposite the first side, having a second plurality of parallel slats defining a second plurality of channels extending along a second direction at a first angle relative to the first direction. The first plurality of channels and the second plurality of channels form a plurality of openings configured to diffuse air moving across the lattice.

Yet another embodiment includes a communication device. The communication device includes a microphone and a housing. The housing includes a microphone cavity. The housing includes a drainage cavity in fluid communication with the microphone cavity and the exterior of the housing. The housing includes a microphone port extending through the microphone cavity and configured to connect the microphone cavity to the microphone a lattice positioned over the microphone cavity. The lattice includes a first side having a first plurality of parallel slats defining a first plurality of channels extending along a first direction. Each of the first plurality of channels has a first channel width extending along a direction perpendicular to the first direction. The lattice includes a second side, opposite the first side, having a second plurality of parallel slats defining a second plurality of channels extending along a second direction at a first angle relative to the first direction. Each of the second plurality of channels has a second channel width extending along a direction perpendicular to the second direction. The first plurality of channels and the second plurality of channels form a plurality of openings configured to diffuse air moving across the lattice. The first channel width and the second channel width are configured to induce capillary action on water coming in contact with the lattice. The lattice is positionable with respect to the microphone cavity such that water drains from the microphone cavity to the drainage cavity.

Figure 1B:
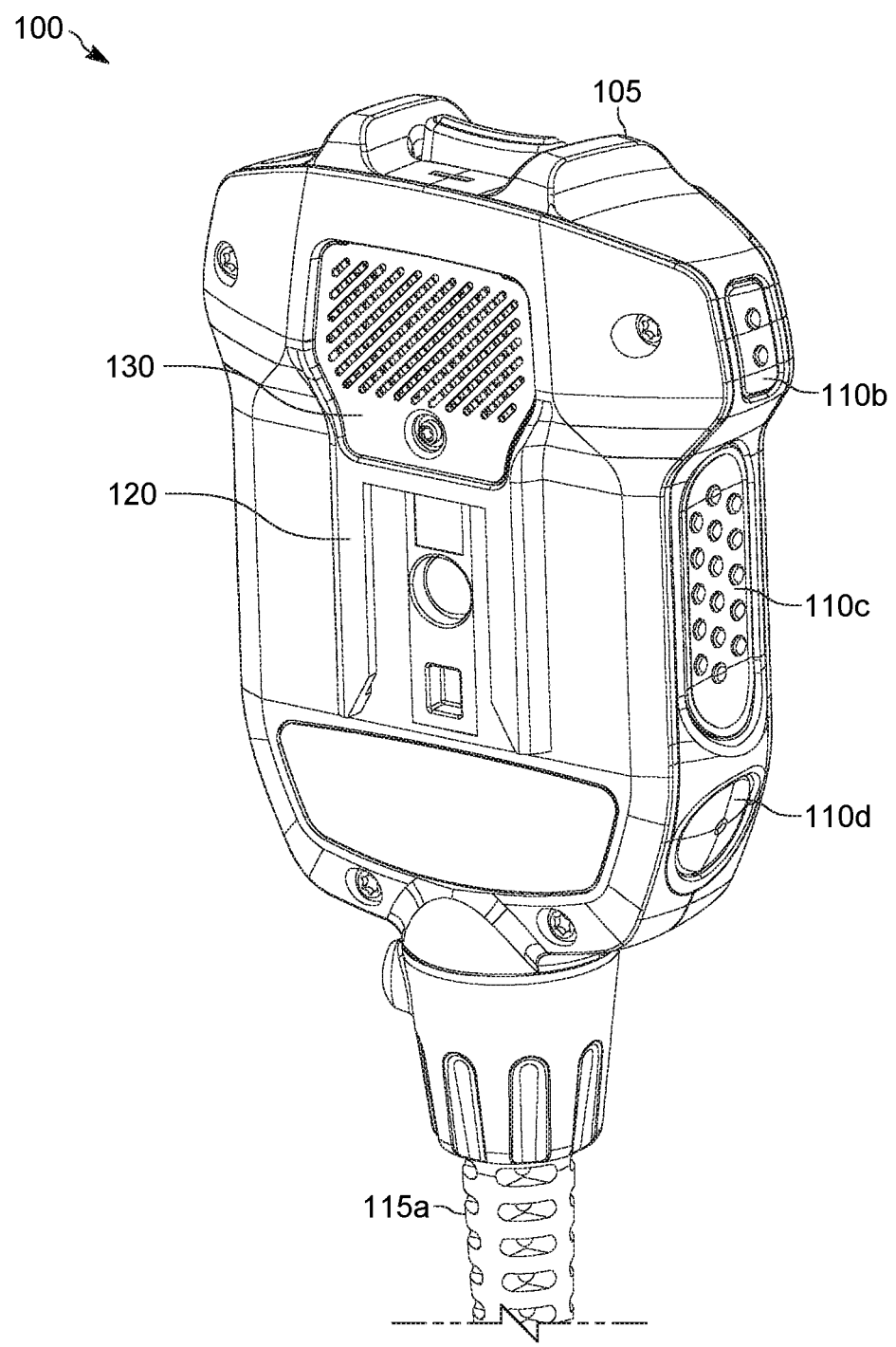
FIG. 1B is a rear perspective view of the remote speaker microphone of FIG. 1A in accordance with some embodiments.

FIG. 1A illustrates a front view of an example remote speaker microphone (RSM) 100, while FIG. 1B illustrates a rear view of the remote speaker microphone 100. In the example shown, the remote speaker microphone 100 includes a housing 105, a plurality of user inputs 110a-e, and a plurality of input/output (I/O) audio connections 115a and b. In some embodiments, the remote speaker microphone 100 is communicatively coupled via an input/output audio connection 115a to an audio transceiver (not shown). Alternatively, or in addition, the remote speaker microphone 100 may be communicatively coupled to one or more audio devices via the input/output audio connection 115b, for example, a 3.5 mm audio jack. The user inputs 110a-e may be actuated to perform different operations of the remote speaker microphone 100. For example, a user may actuate a user input 110b to enable a push to talk (PTT) operation of the remote speaker microphone 100.

The remote speaker microphone 100 also includes an attachment point 120. The attachment point 120 provides a mechanism for securely mounting the remote speaker microphone 100 to a clip, clasp, hook, or similar component, as desired. The remote speaker microphone 100 also includes a bezel 125 coupled to the front of the housing 105. The bezel 125 serves as a protective cover for a front microphone cavity (See FIG. 3) and various other internal components of the remote speaker microphone 100. In some embodiments, the bezel 125 is configured to diffuse air moving across the bezel 125. The remote speaker microphone 100 also includes a rear microphone grille 130 covering a second microphone cavity (See FIG. 2). As described below, the remote speaker microphone 100 is able to capture audio from a plurality of directions via microphones positioned in the front and rear microphone cavities.

Figure 2:
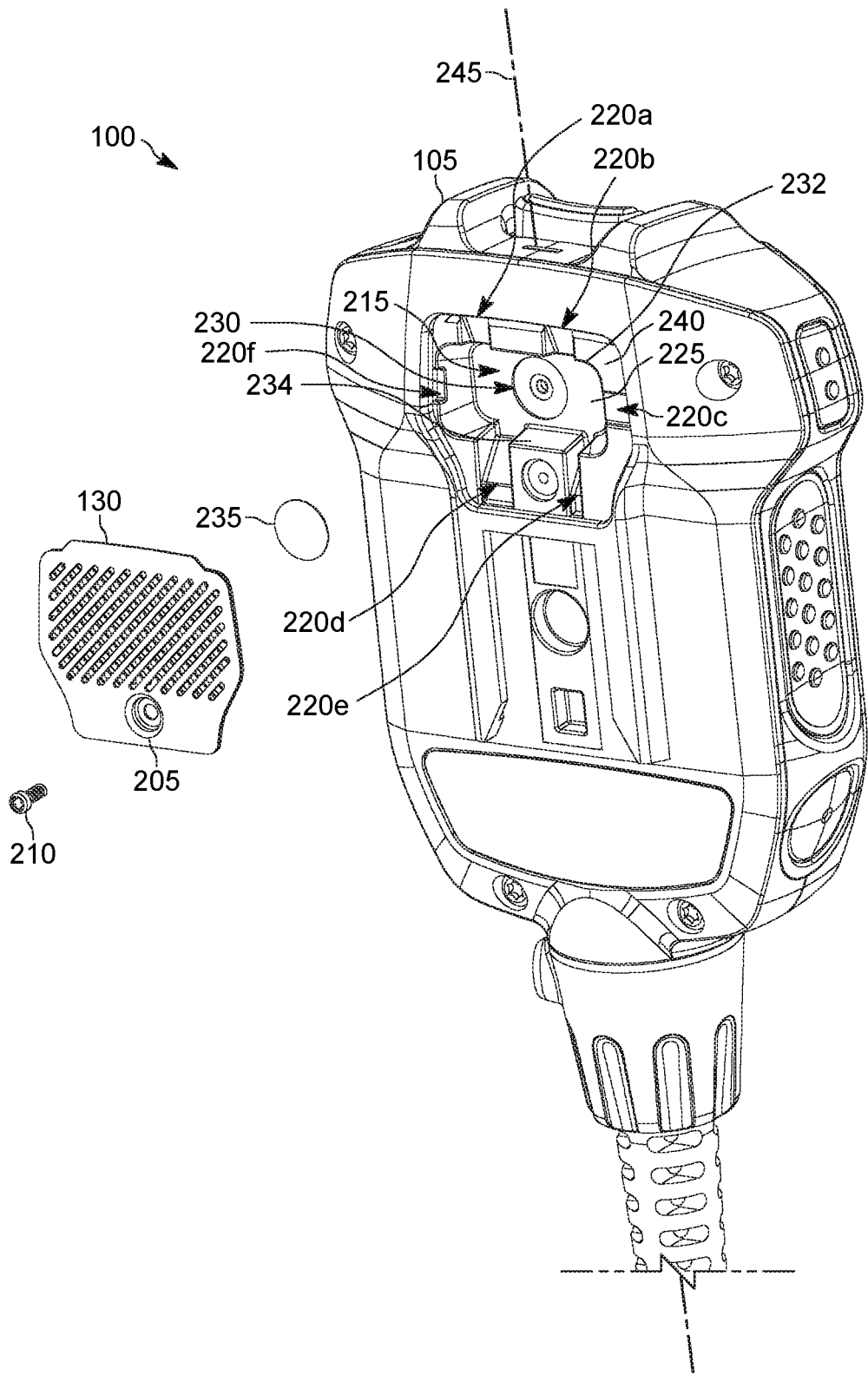
FIG. 2 is a partially exploded rear view of a remote speaker microphone in accordance with some embodiments.

Turning now to FIG. 2, a partially exploded rear view of the remote speaker microphone 100 is shown. The rear microphone grille 130 includes a recessed fastener opening 205 and is removably coupled to the housing 105 with a fastener 210 (for example, a bolt or screw) for facilitating attachment to the housing 105. The rear of the housing 105 includes a plurality of cavities substantially covered by the rear microphone grille 130, including a rear microphone cavity 215 and a plurality of rear drainage cavities 220a-f. A bottom surface 225 of the rear microphone cavity 215 (for example, a surface opposed the rear microphone grille 130) includes a rear microphone array 230. In the illustrated embodiment, the rear microphone array 230 includes a single microphone (not shown) which is protected from fluid intrusion by a rear microphone port membrane 235, but may be configured with more than one microphone as desired.

The rear drainage cavities 220a-f are in fluid communication with the rear microphone cavity 215. In the illustrated embodiment, the rear drainage cavities 220a-f are distributed about an edge 232 of the rear microphone cavity 215, and extend from the bottom surface 225 to a top surface 240. Accordingly, one or more rear drainage cavities 220 extend through at least one sidewall of the rear microphone cavity 215. In some embodiments, one or more rear drainage cavities 220 extend from the bottom surface 225 to the exterior of the housing 105 via one or more sidewalls 234 of the rear microphone cavity 215.

In the example embodiment, the rear drainage cavities 220a, b extend from the bottom surface 225 to the top surface 240 in a generally upward direction relative to a longitudinal axis 245 of the housing 105. The rear drainage cavities 220d, e extend from the bottom surface 225 to the top surface 240 in a generally downward direction relative to the longitudinal axis 245 of the housing 105. The rear drainage cavity 220c extends from the bottom surface 225 to the top surface 240 in a generally lateral direction relative to the longitudinal axis 245 of the housing 105. Accordingly, in a plurality of orientations, the housing 105 provides at least one rear drainage cavity 220 that is configured for shedding fluid (for example, water) from the rear microphone cavity 215. For example, in the case that the housing 105 is in an inverted orientation, the rear drainage cavities 220a,b provide inclined surfaces along which fluid, under the force of gravity, capillary action, or both, may flow freely out of the rear microphone cavity 215. In some embodiments, the rear microphone grille 130 is configured to assist in expelling fluid from the rear microphone cavity 215.

Figure 3:
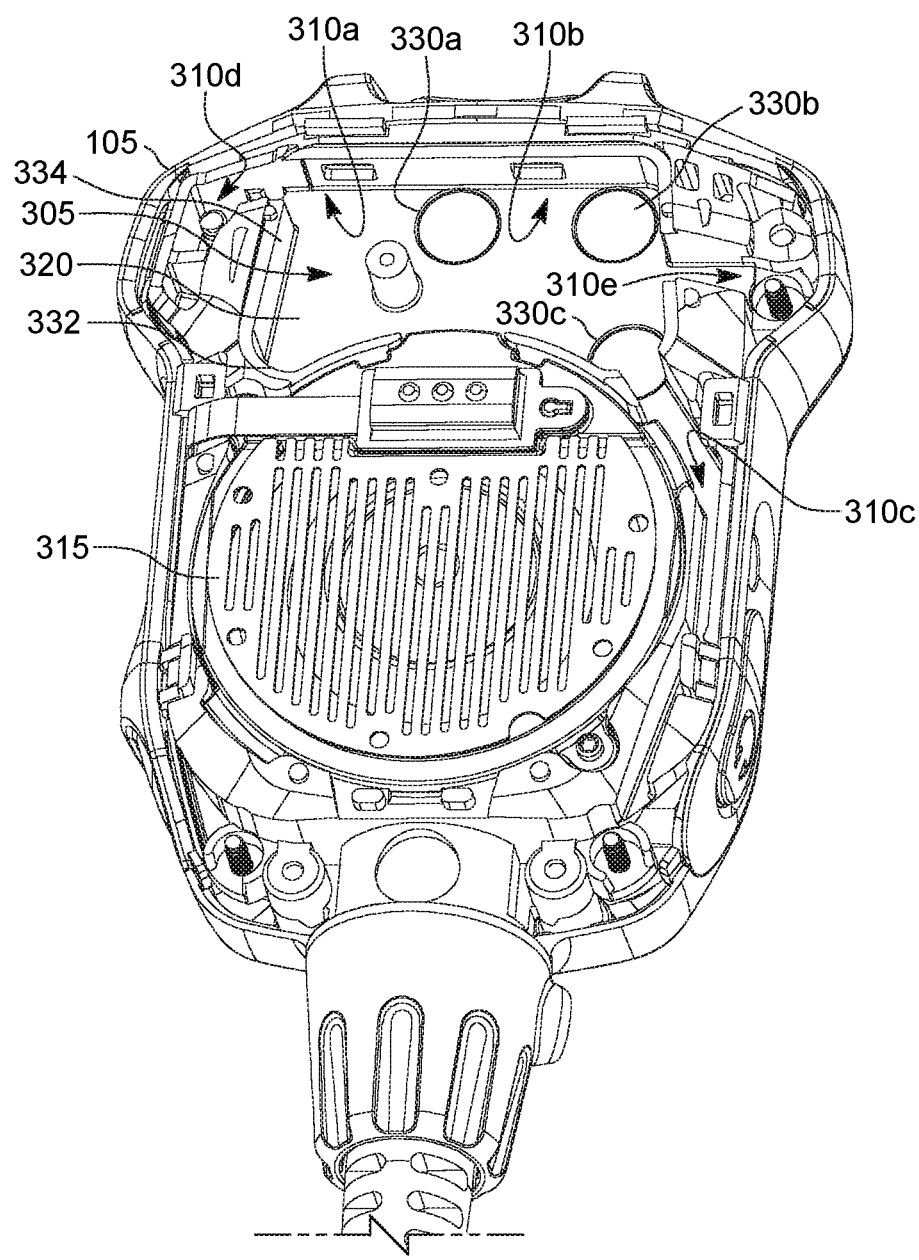
FIG. 3 is a perspective view of a remote speaker microphone in accordance with some embodiments.

FIG. 3 illustrates a front perspective view of the remote speaker microphone 100. The housing 105 further includes a front microphone cavity 305, a plurality of front drainage cavities 310a-e. The housing 105 houses, among other things, a speaker 315. The front drainage cavities 310a-e are in fluid communication with the front microphone cavity 305. A bottom surface 320 of the front microphone cavity 305 includes a front microphone array 325. The front microphone array 325 includes a plurality of microphones (not shown) which are protected from fluid intrusion by corresponding microphone port membranes 330a-c. In the illustrated embodiment, the front microphone array 325 includes three microphones, but may be configured with any number of microphones as desired.

In the illustrated embodiment, the front drainage cavities 310a-e are distributed about an edge 332 of the front microphone cavity 305. The front drainage cavities 310a-e extend through at least one sidewall 334 of the front microphone cavity 305 to the exterior of the housing 105. For example, the front drainage cavities 310a, b extend upward through a first sidewall of the front microphone cavity 305 to a top side of the housing 105, whereas the front drainage cavity 310c extends generally downward through a second sidewall of the front microphone cavity 305 to a bottom side of the housing 105, and the front drainage cavities 310d, e extend outwardly through respective lateral sidewalls 334 of the front microphone cavity 305 to the exterior of the housing 105.

Accordingly, in a plurality of orientations, the housing 105 provides at least one front drainage cavity 310 which is configured for shedding fluid from the front microphone cavity 305. For example, in the case that the housing 105 is in an upright orientation, the front drainage cavity 310c provides an inclined surface along which fluid, under the force of gravity, capillary action, or both, may flow out of the front microphone cavity 305.

Figure 4:
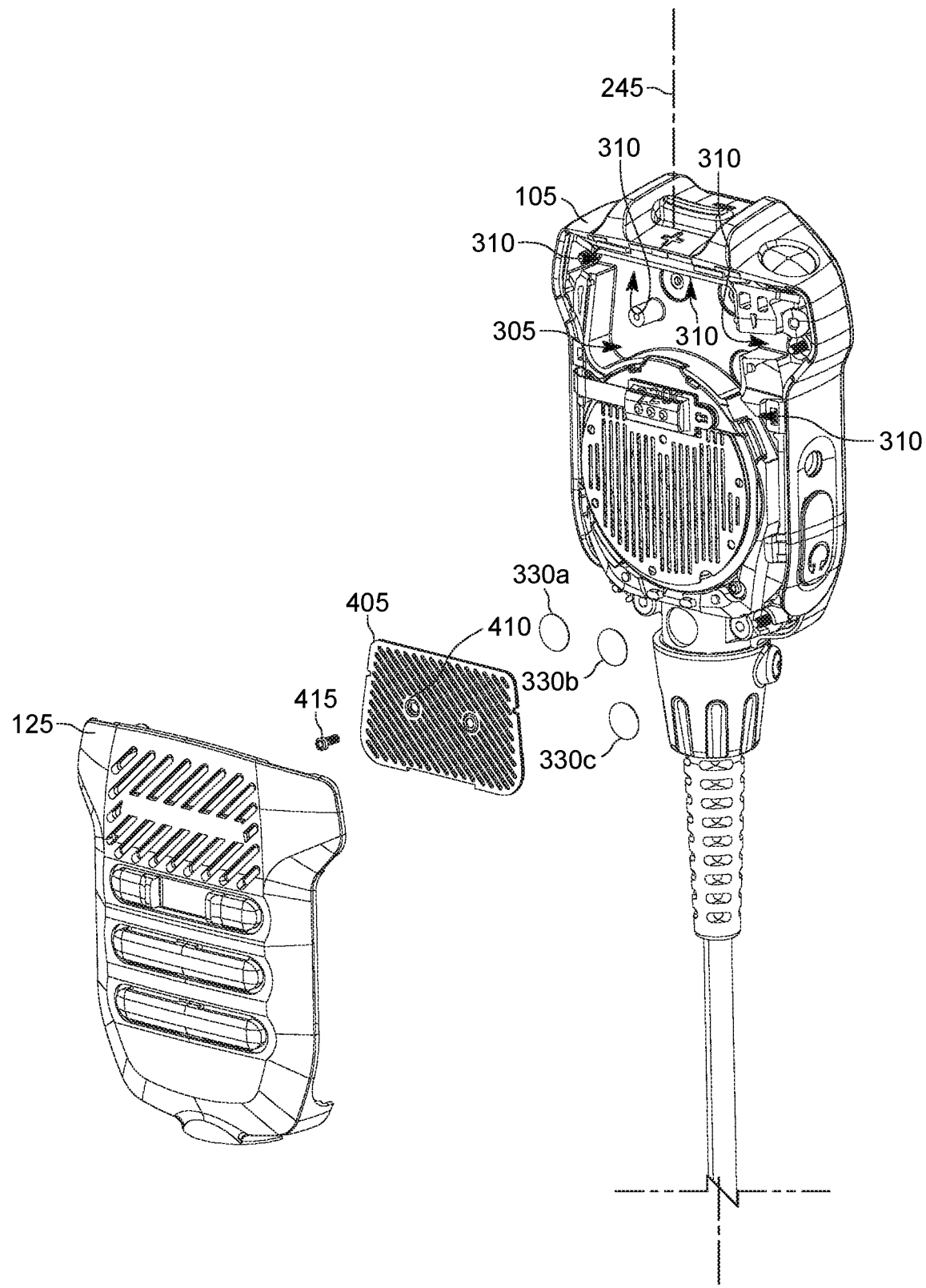
FIG. 4 is an exploded view of a remote speaker microphone in accordance with some embodiments.

In the example illustrated in FIG. 4, the remote speaker microphone 100 further includes a front microphone grille 405. The front microphone grille 405 is positioned over the front microphone cavity 305, between the housing 105 and the bezel 125. The front microphone grille 405 includes at least one recessed fastener opening 410 and is removably coupled to the housing 105 by a fastener 415 extending therethrough. In some embodiments, the front microphone grille 405 is configured to cause fluid (for example, water)

to drain from the front microphone cavity 305 via one or more of the drainage cavities 310a-e. In some embodiments, the front microphone grille 405 is configured to diffuse air moving across the front microphone grille 405. In some embodiments, the front microphone grille 405 is made from a hydrophilic material.

Figure 5A:
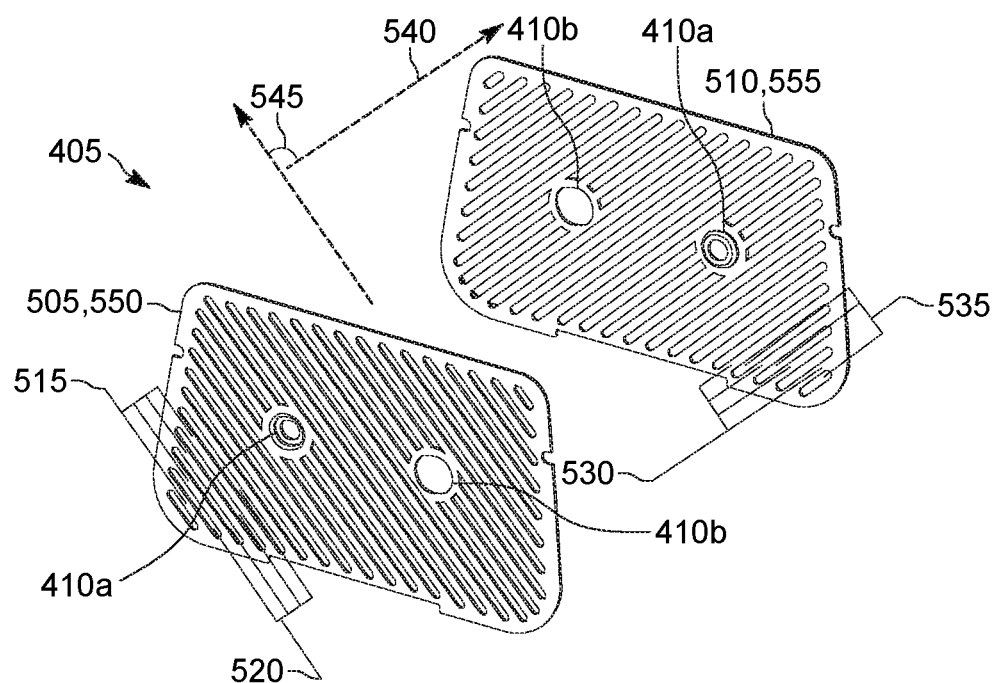
FIG. 5A is an exploded view of a grille for a remote speaker microphone in accordance with some embodiments.

The front microphone grille 405 will continue to be described with reference to FIG. 5A. In the illustrated example, the front microphone grille 405 includes a first side 505 and a second side 510. The first side 505 includes a first plurality of slats 515 which define a first plurality of channels 520 extending through the first side 505. The slats 515 and the channels 520 extend along a first direction 525. In the illustrated example, the first plurality of slats 515 are parallel to one another, but this is not required. In other embodiments, one of more of the first plurality of slats 515 may have a configuration other than parallel, such as a curvilinear configuration. Accordingly, one or more of the first plurality of channels 520 may also have a configuration other than parallel, such as a curvilinear configuration.

The second side 510 includes a second plurality of slats 530 which define a second plurality of channels 535 extending through the second side 510. The slats 530 and the channels 535 extend along a second direction 540. In the illustrated example, the second plurality of slats 530 are parallel, but this is not required. In other embodiments, one or more of the first plurality of slats 530 may have a configuration other than parallel, such as a curvilinear configuration. Accordingly, one or more of the second plurality of channels 535 may also have a configuration other than parallel, such as a curvilinear configuration.

The first direction 525 and the second direction 540 intersect at an first angle 545, for example, 45 degrees, 60 degrees, or 90 degrees (for example, relative to the longitudinal axis 245). Accordingly, in the illustrated embodiment, the first plurality of slats 515 intersects the second plurality of slats 530 at the first angle 545, and the first plurality of channels 520 also intersect the second plurality of channels 535 at the first angle 545. In some embodiments, a first portion 550 of the front microphone grille 405 includes the first side 505. In some embodiments, a second portion 555 of the front microphone grille 405 includes the second side 510. In some embodiments, the first portion 550 is coupled to the second portion 555. For example, the first portion 550 and second portion 555 may be similar portions arranged in a facing relationship to each other. In some embodiments, the first side 505 and the second side 510 are integrally formed as a unitary piece part.

Figure 5B:
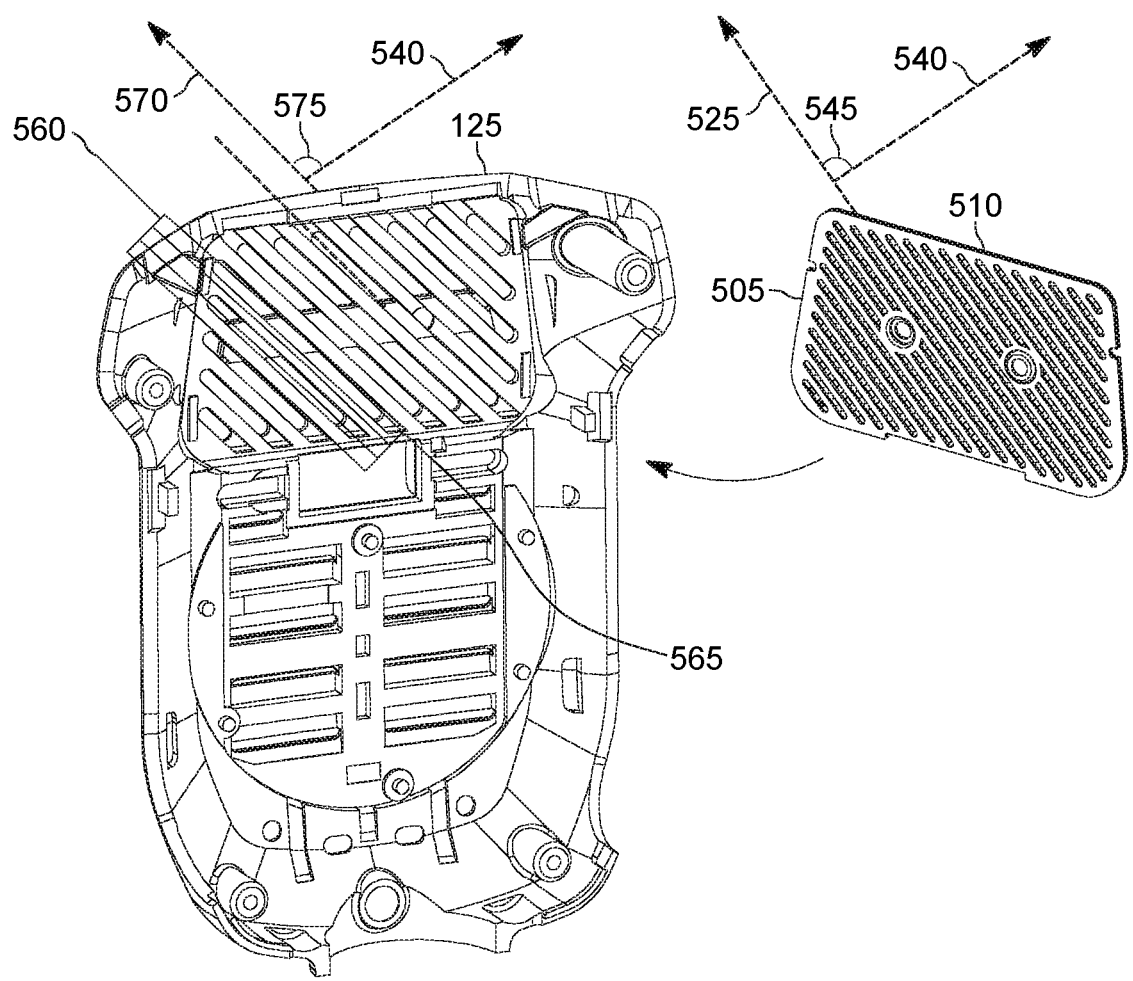
FIG. 5B is a perspective view of the interior of a bezel of a remote speaker microphone interfacing the grille of FIG. 5A in accordance with some embodiments.

FIG. 5B illustrates an interior view of the bezel 125. The bezel 125 includes a third plurality of slats 560 which define a third plurality of channels 565 extending through the bezel 125. The slats 560 and the channels 565 extend along a third direction 570. In the illustrated embodiment, the third plurality of slats 560 are parallel, but this is not required. In other embodiments, one of more of the third plurality of slats 560 may have a configuration other than parallel, such as a curvilinear configuration. Accordingly, one or more of the third plurality of channels 565 may also have a configuration other than parallel, such as a curvilinear configuration. The third direction 570 intersects the second direction 540 at a second angle 575, for example, 45 degrees, 60 degrees, or 90 degrees. In the illustrated example, the second angle 575 is equal to the first angle 545. That is to say, in the illustrated example, the third direction 570 is parallel to the first direction 525. However, in other embodiments, the first angle 545 and the second angle 575 may be different angles In some embodiments, one of more of the first and second angles 545 and 575 may be selected to promote diffusion of air across the bezel 125. Additionally, one or more of the first and second angles 545 and 575 may be selected to promote drainage of water from an interior cavity, such as the front microphone cavity 305 or the rear microphone cavity 215. Further, dimensions of the first plurality of slats 515, the first plurality of channels 520, the second plurality of slats 530, the second plurality of channels 535, the third plurality of slats 560, and the third plurality of channels 565 may configured to promote diffusion of air and/or drainage of water from a microphone cavity, for example, by inducing capillary action.

Although the foregoing description is given in reference to the front microphone grille 405, the rear microphone grille 130 may be similarly configured. That is to say, in some embodiments, the rear microphone grille 130 includes first and second pluralities of slats and channels extending in respective directions at an angle relative to each other. In some embodiments, one or more dimensions or angles of the rear microphone grille 130 are substantially identical to one or more corresponding dimensions or angles of the front microphone grille 405.

Figure 6:
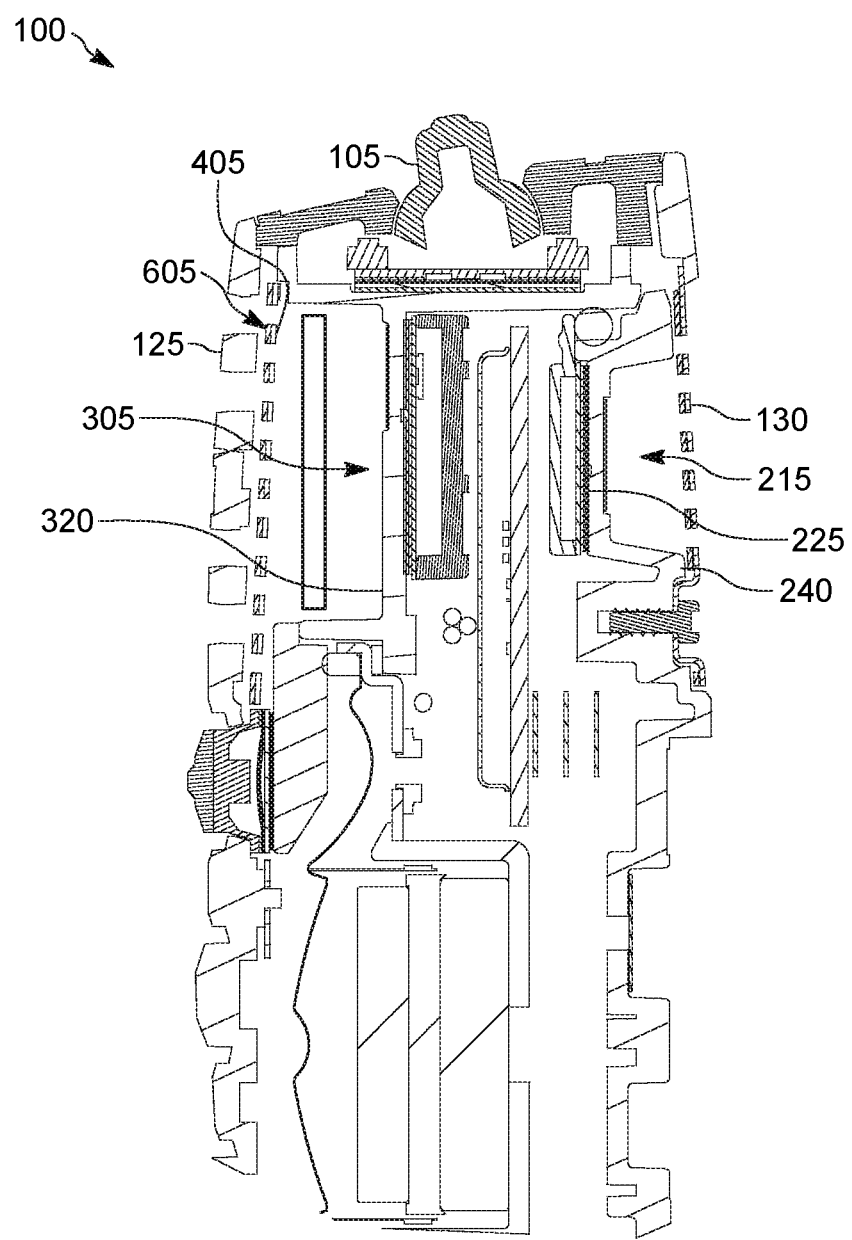
FIG. 6 is a cross-sectional view of a remote speaker microphone in accordance with some embodiments.

FIG. 6 illustrates a cross-sectional view of the remote speaker microphone, including the bezel 125, the rear microphone grille 130, and the front microphone grille 405. The bezel 125 is positioned apart from the front microphone grille 405 at a bezel separation distance 605. In some embodiments, the bezel separation distance 605 is configured to promote diffusion of air across the bezel 125. In some embodiments, the bezel separation distance 605 is configured to promote drainage of water from the front microphone cavity 305 and the front microphone grille 405. For example, a bezel separation distance 605 may be less than 1 mm and be configured to promote or induce capillary action to drain water from the front microphone grille 405. In some embodiments, a bezel separation distance 605 is between 0.2 mm and 0.7 mm.

Figure 7A:
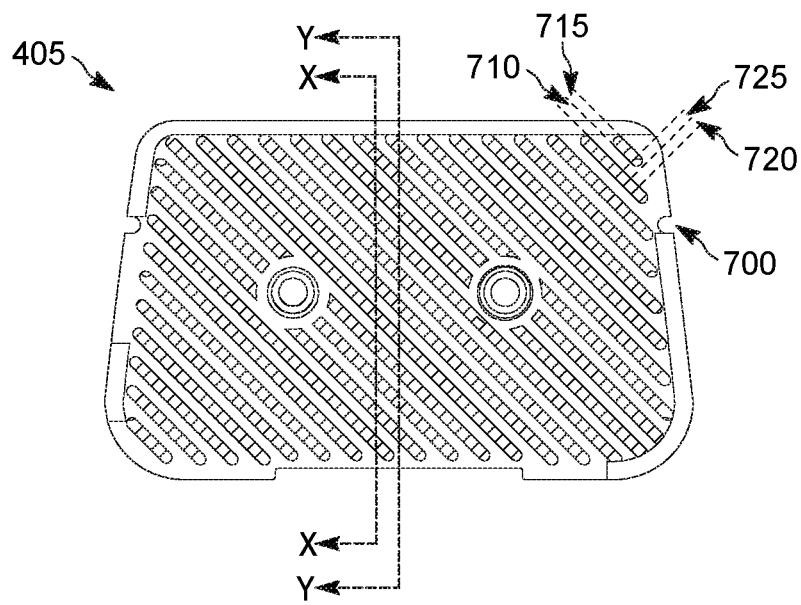
FIG. 7A is a profile view of a microphone grille in accordance with some embodiments.

FIG. 7A illustrates a profile view of the front microphone grille 405. In the illustrated embodiment, the first side 505 is facing outward from the page, while the second side 510 is partially obscured by the first plurality of slats 515 and visible through the first plurality of channels 520. The intersection of the first plurality of slats 515 and the second plurality of slats 530 generally forms a lattice 700. At the intersections of the first plurality of channels 520 and the second plurality of channels 535, a plurality of openings 705 are formed. The openings 705 extend through the front microphone grille 405 in a direction generally perpendicular to the first side 505 and the second side 510. Alternatively, the openings 705 may extend through the front microphone grille 405 at an oblique angle relative to the first side 505 and the second side 510.

The first plurality of slats 515 have a first slat width 710. In the illustrated embodiment, each of the first plurality of slats have the first slat width 710 uniformly along their entire length, but this is not required. For example, the first plurality of slats 515 may include more than one slat width, or one or more of the first plurality of slats 515 may have a non-uniform slat width. In some embodiments, the first slat width 710 is configured to promote capillary action. For example, the first slat width may be between 0.2 mm and 0.7 mm.

The first plurality of channels 520 have a first channel width 715. In the illustrated embodiment, each of the first plurality of channels have the first channel width 715 uniformly along their entire length, but this is not required.

For example, the first plurality of channels 520 may include more than one channel width, or one or more of the first plurality of channels 520 may have a non-uniform channel width. In some embodiments, the first channel width 715 is configured to promote capillary action. For example, the first channel width may be between 0.2 mm and 0.7 mm.

The second plurality of slats 530 have a second slat width 720. In the illustrated embodiment, each of the second plurality of slats have the second slat width 720 uniformly along their entire length, but this is not required. For example, the second plurality of slats 530 may include more than one slat width, or one or more of the second plurality of slats 530 may have a non-uniform slat width. In some embodiments, the second slat width 720 is configured to promote capillary action. For example, the second slat width may be between 0.2 mm and 0.7 mm.

The second plurality of channels 535 have a second channel width 725. In the illustrated embodiment, each of the second plurality of channels have the second channel width 725 uniformly along their entire length, but this is not required. For example, the second plurality of channels 535 may include more than one channel width, or one or more of the second plurality of channels 535 may have a non-uniform channel width. In some embodiments, the second channel width 725 is configured to promote capillary action. For example, the second slat width may be between 0.2 mm and 0.7 mm.

In some embodiments, one or more of the first slat width 710 the first channel width 715, the second slat width 720, and the second channel width 725 are equal to each other. For example, the first slat width 710 may be equal to the second slat width 720. In some embodiments, the arrangement and dimensions of the first plurality of slats 515 and the first plurality of channels 520 induces capillary action to drain water from the openings 705.

Figure 7B:
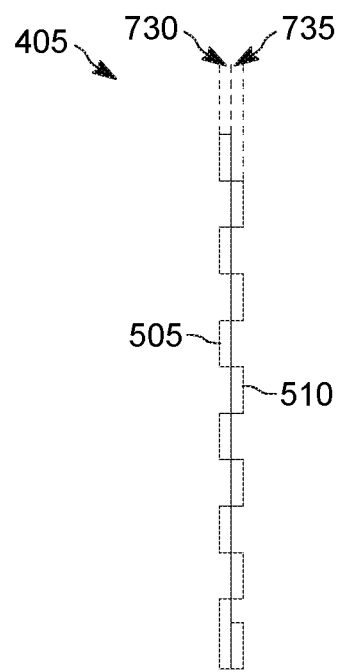
FIG. 7B is a cross-sectional view of the microphone grille of FIG. 7A in accordance with some embodiments.
Figure 7C:
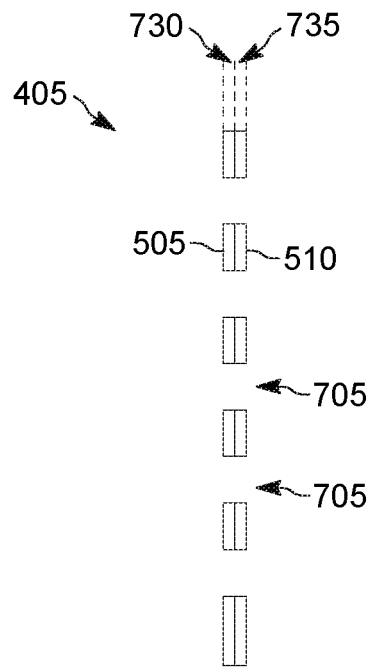
FIG. 7C is a cross-sectional view of the microphone grille of FIG. 7A in accordance with some embodiments.

FIG. 7B illustrates a cross-sectional view of the front microphone grille 405 taken along section line X. FIG. 7C illustrates a cross-sectional view of the front microphone grille 405 taken along section line Y. The front microphone grille 405 includes the first side 505 and the second side 510. The first plurality of slats have a first slat thickness 730. The second plurality of slats have a second slat thickness 735. In the illustrated embodiment, the first slat thickness 730 is equal to the second slat thickness 735. In some embodiments, the one or more of the first slat thickness 730 and the second slat thickness 735 are configured to diffuse air across the front microphone grille 405.

Further, as the openings 705, in conjunction with the front microphone cavity 305, the first slat thickness 730, and the second slat thickness 735, influence a resonant frequency of the front microphone cavity 305, one or more of a channel width, a slat width, a slat thickness, and a volume of the front microphone cavity 305 may be configured to reduce an impact of the resonant frequency on audio captured by the front microphone array 325. For example, in some embodiments, a resonant frequency is greater than 5 kHz. In other embodiments, the resonant frequency of the front microphone cavity 305 is greater than 8 kHz.

Figure 8A:
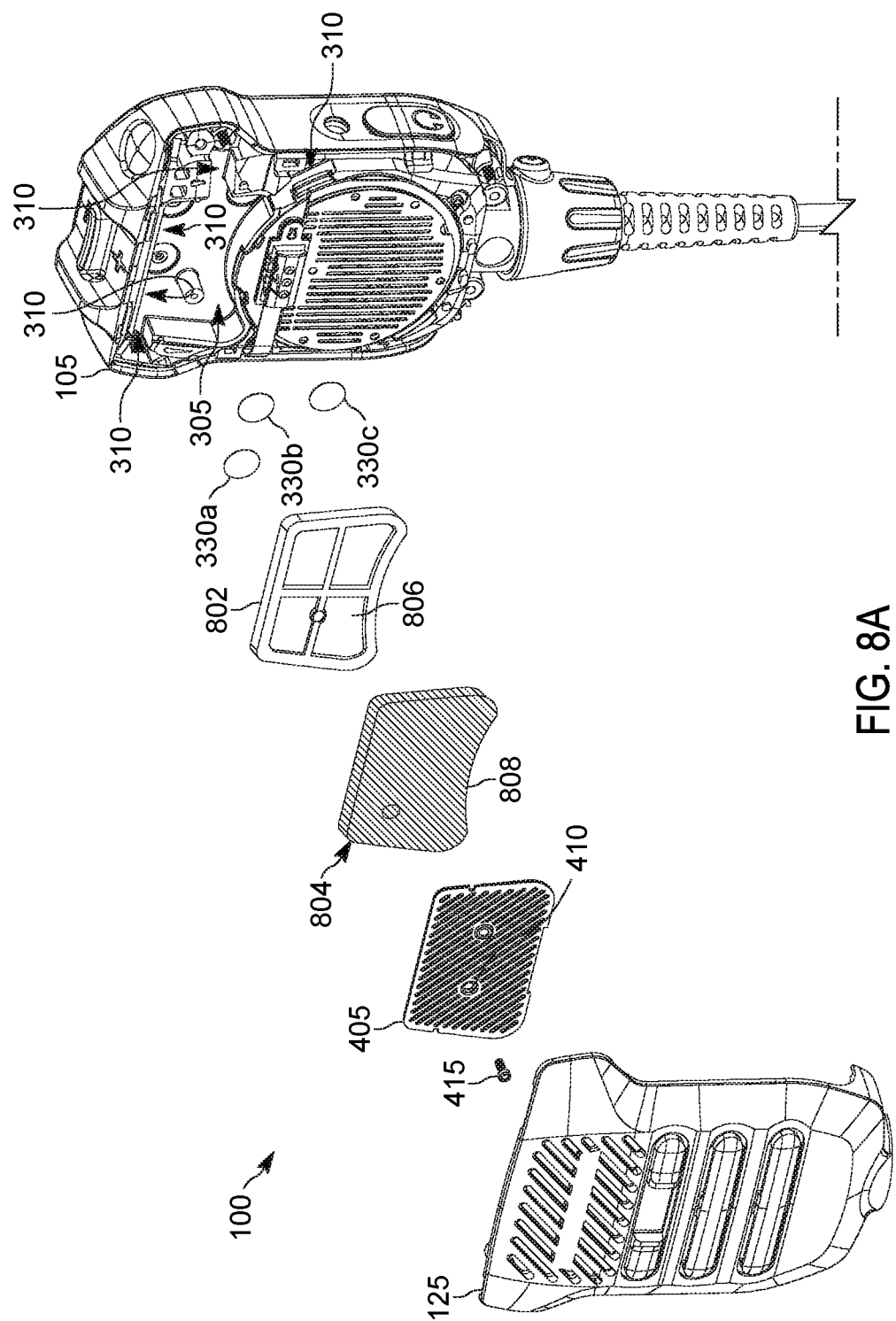
FIG. 8A is an exploded view of a remote speaker microphone in accordance with some embodiments.
Figure 8B:
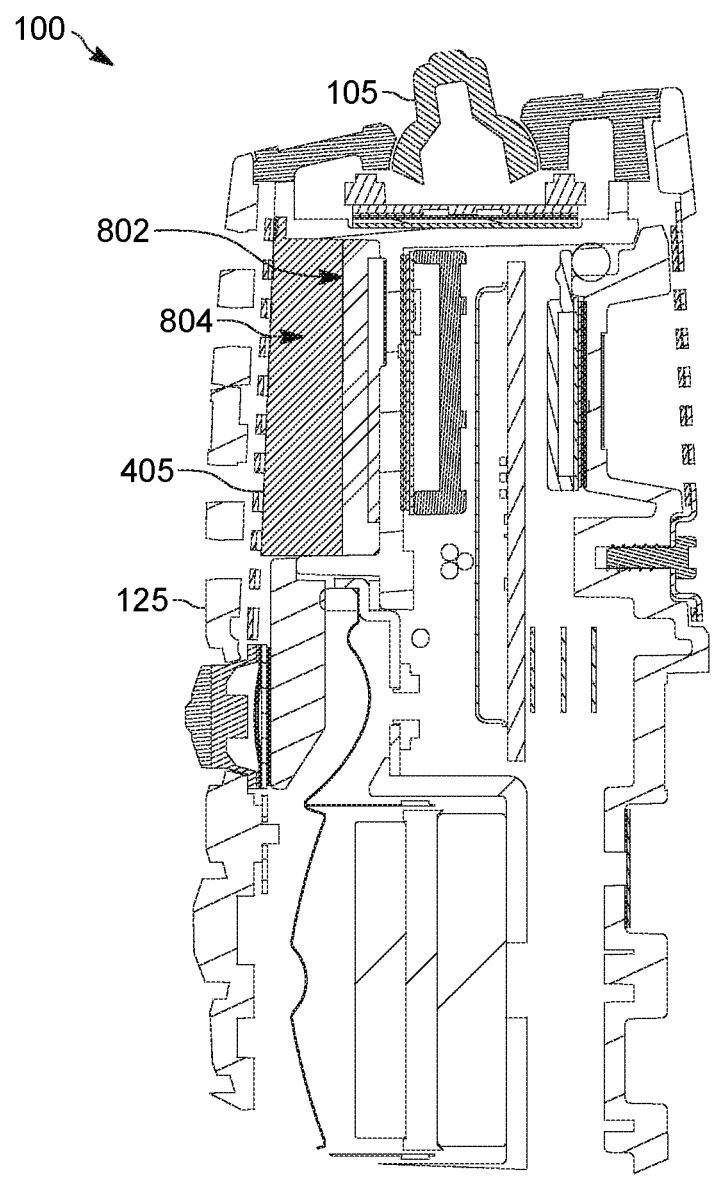
FIG. 8B is a cross-sectional view of a remote speaker microphone in accordance with some embodiments.

In some embodiments, a tray is added to the front or rear microphone cavities. For example, as illustrated in FIG. 8 a tray 802 is positioned between the microphone grille 405 and the microphone membranes 330a-c. The tray 802 supports a wind absorbing material 804, which drains water. In some embodiments, the wind absorbing material 804 has a thickness of approximately 4 mm. In some embodiments, the wind absorbing material 804 is composed of Scotch-Brite™. In some embodiments, the tray 802 is positioned such that a top 806 of the wind absorbing material 804 is in contact with the microphone grille 405 and a bottom 808 of the tray 802 forms an air buffer between the wind absorbing material 804 and the microphone membranes 330a-c. The air buffer reduces transmission of vibrations and other noises within the wind absorbing material 804 and the tray 802 to the microphone membranes 330a-c. In some embodiments, the air buffer has a thickness of approximately 1 mm. In some embodiments, the wind absorbing material 804 and/or the tray 802 is removable for use in cases where rain/water is expected to be a predominant environmental condition.

Figure 9:
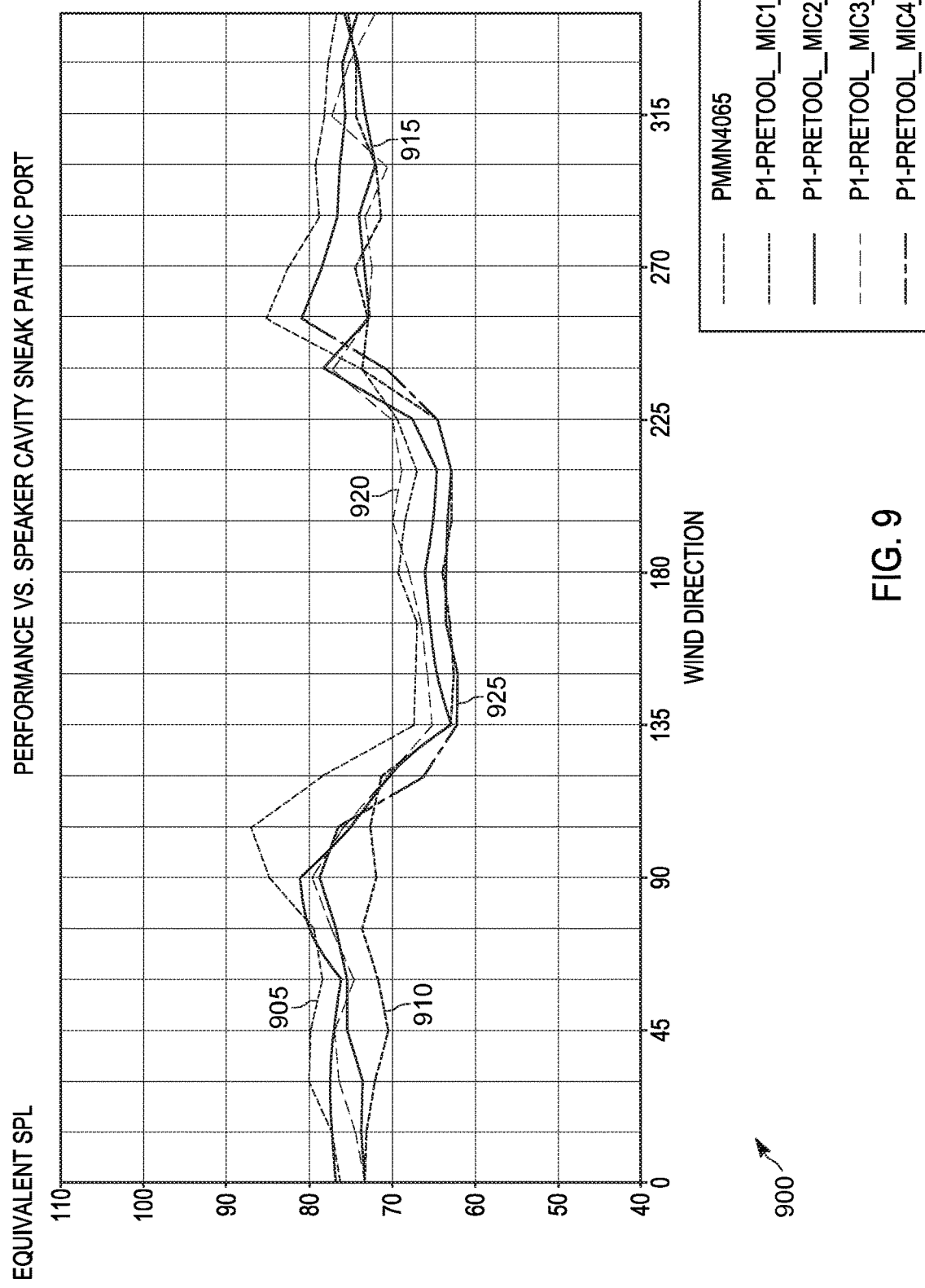
FIG. 9 is a chart illustrating the wind noise performance of a microphone grille in accordance with some embodiments.

FIG. 9 is a line chart 900 illustrating the wind noise received by the microphones of the remote speaker microphone 100, as compared to a sneak path microphone port. The abscissa of the line chart 900 is an angle of a microphone port in relation to a wind direction. The ordinal of the line chart 900 is an equivalent sound pressure level (SPL). The sneak path microphone graph 905 is a baseline performance graph, illustrating the performance of the sneak path microphone without a microphone grill. The sneak path microphone graph 905 illustrates that microphone performance is generally best (that is, experiences the lowest sound pressure level) when the microphone is oriented away from the direction of the wind (for example, at 180 degrees). The sneak path microphone graph 905 further illustrates that microphone performance is generally worst (that is, experiences the highest sound pressure level) near 90 degrees and 270 degrees, when wind is coming from either the left or right side of the microphone (that is, blowing nearly parallel to and across the face of the remote speaker microphone 100).

The line chart 900 further illustrates a plurality of microphone graphs of shielded microphones. The microphone graphs 910, 915, and 920 correspond to microphones of a front microphone array 325, the microphones shielded by a front microphone grille 405. The microphone graph 925 correspond to a microphone of a rear microphone array 230, the microphone shielded by a rear microphone grille 130. As can be seen from the line chart 900, the microphones shielded by the front microphone grille 405 and the rear microphone grille 130 exhibit improved performance in comparison to the sneak path microphone.

Figure 10A:
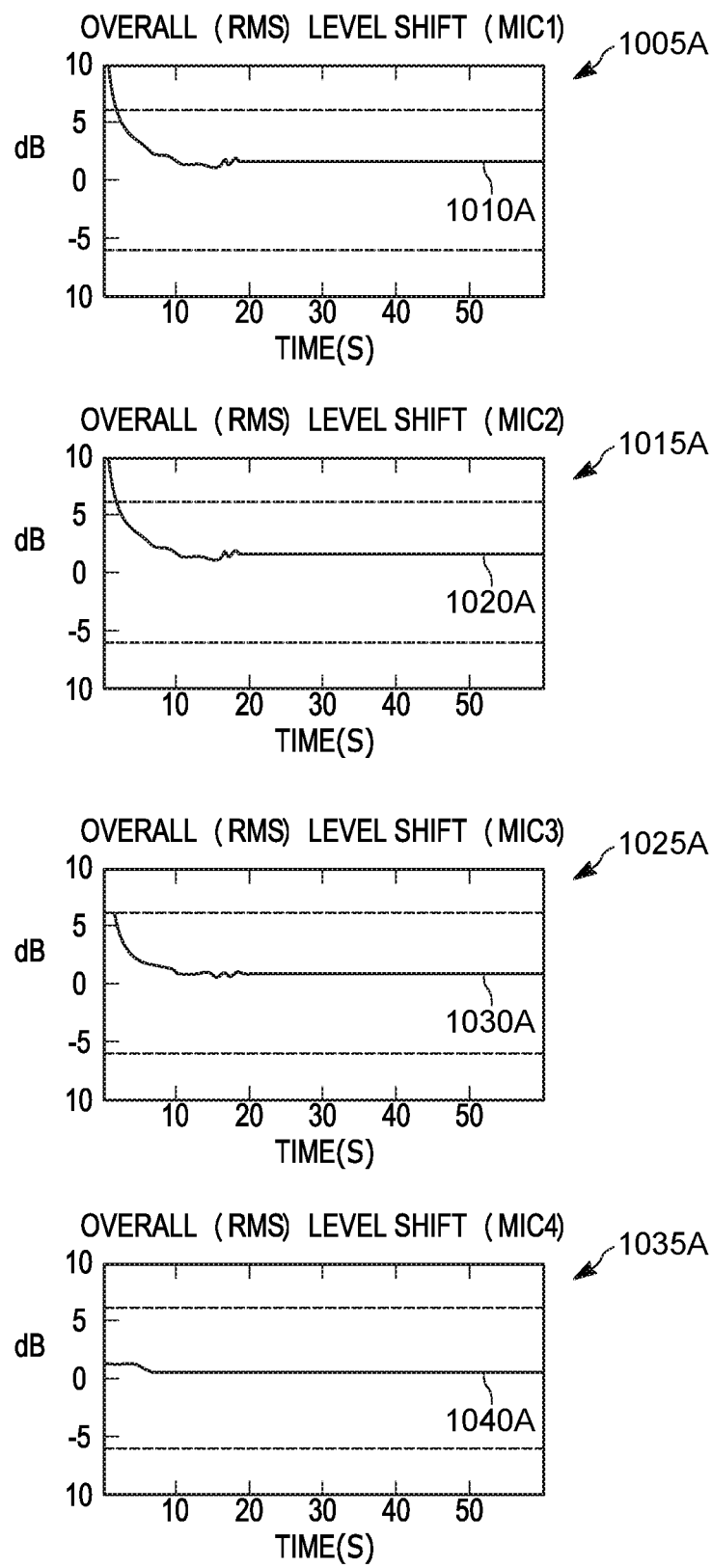
FIGS. 10A-C are a series of charts illustrating the water drainage performance of a remote speaker microphone in accordance with some embodiments.
Figure 10B:
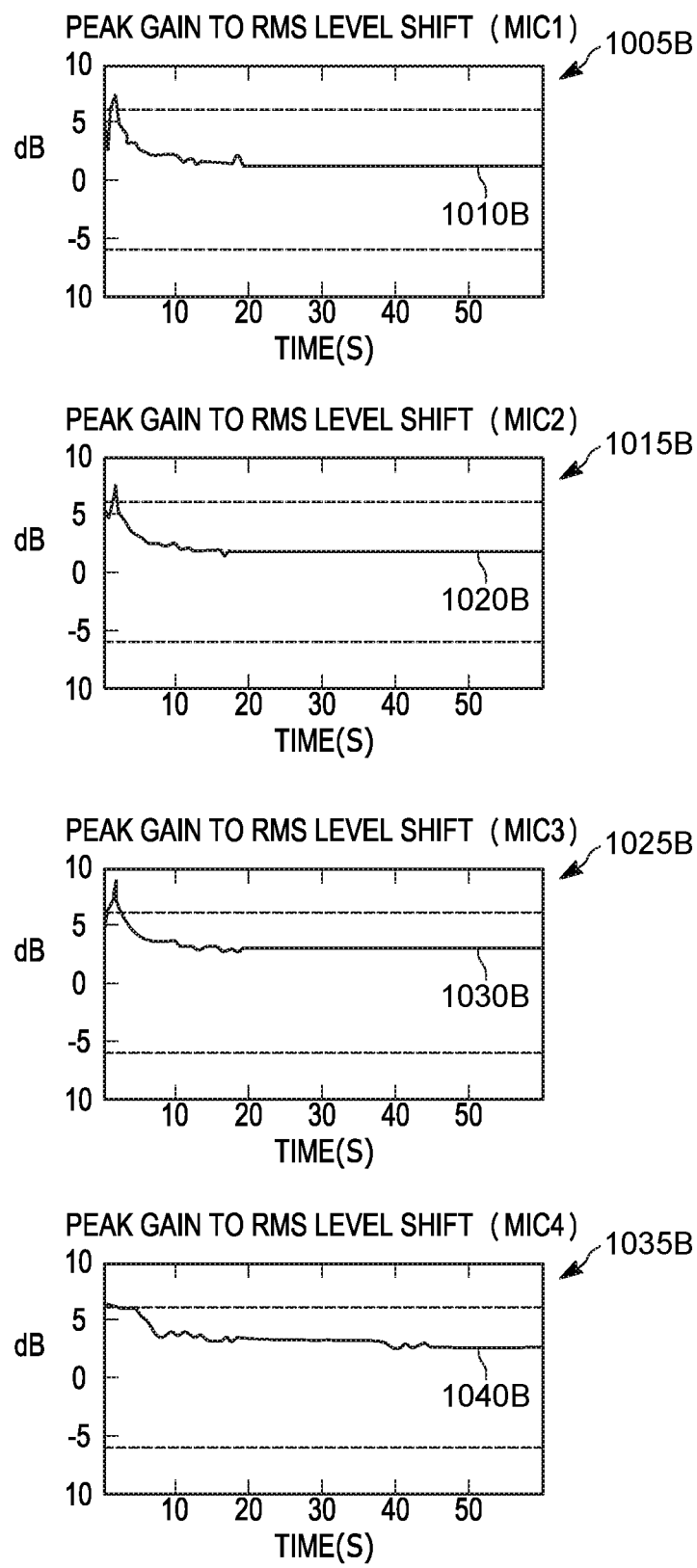
Figure 10C:
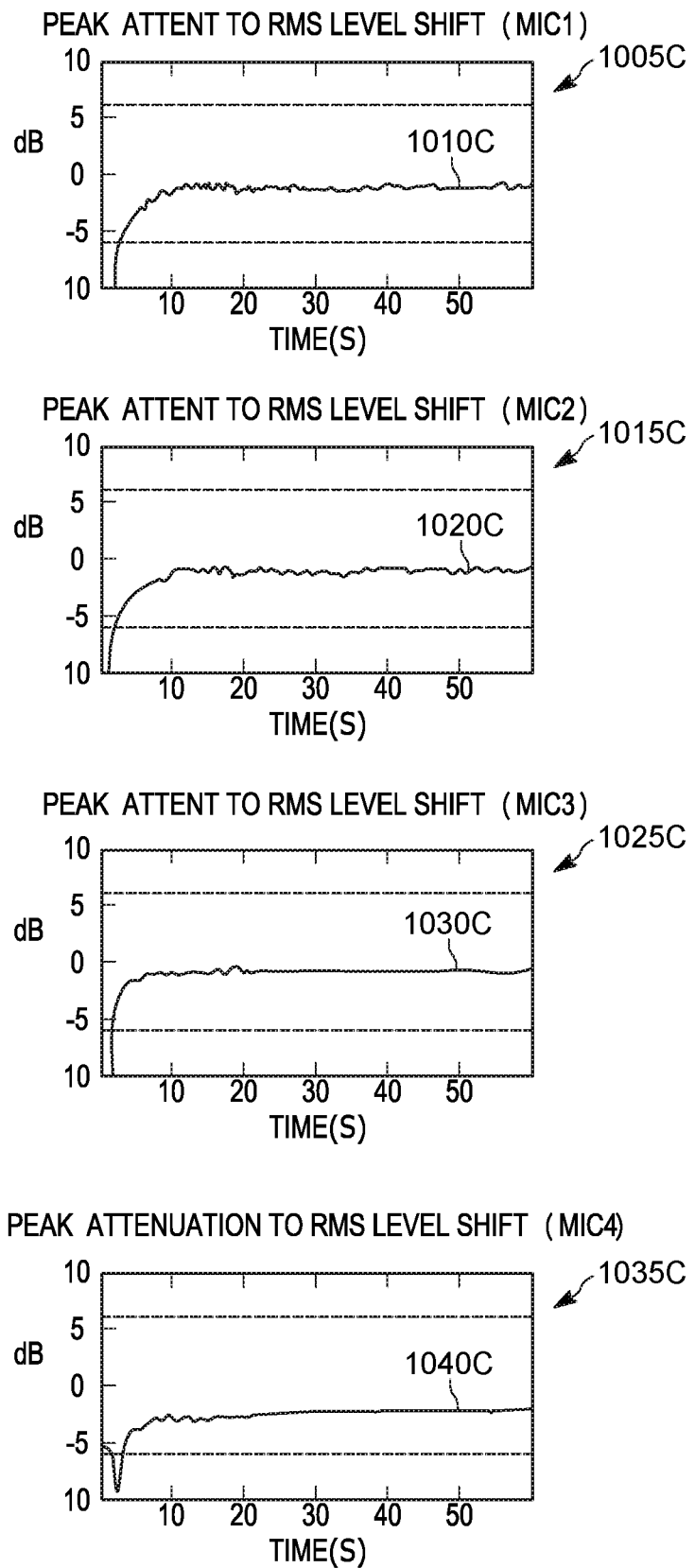

FIGS. 10A-C illustrate a series of charts illustrating the water drainage performance of the remote speaker microphone 100. The series of charts illustrate three different parameters for each microphone of the front microphone array 325, when subjected to a water test. The tested embodiment includes a front microphone array 325 having four microphones (mic1, mic2, mic3, mic4). For example, a water test may be conducted by placing the remote speaker microphone 100 in a test station, and spraying the remote speaker microphone 100 with water for a period of time, for example, 10 seconds. Immediately get out the period of time, an audio signal is produced by a speaker in the vicinity of the remote speaker microphone and the performance of each microphone is captured for a second period of time, for example, 60 seconds. For these particular graphs, the abscissa is the time.

FIG. 10A illustrates the overall level shift of the microphones during the water test. The ordinals of these graphs correspond to the attenuation in decibels (dB). Chart 1005A illustrates the first microphone performance graph 1010A (for, which starts at maximum attenuation immediately after the application of water is stopped, and rapidly improves to a normal attenuation value. Chart 1015A illustrates the first microphone performance graph 1020A, which starts at maximum attenuation immediately after the application of water is stopped, and rapidly improves to a normal attenuation value. Chart 1025A illustrates the first microphone performance graph 1030A, which starts at maximum attenuation immediately after the application of water is stopped, and rapidly improves to a normal attenuation value. Chart 1035A illustrates the first microphone performance graph 1040A, which starts at maximum attenuation immediately after the application of water is stopped, and rapidly improves to a normal attenuation value.

FIG. 10B illustrates the peak gain to root-mean-square (RMS) level shift of the microphones during the water test. The ordinals of these graphs correspond to the attenuation in decibels (dB). Chart 1005B illustrates the first microphone performance graph 1010B, which starts at maximum gain shortly after the application of water is stopped, and rapidly improves to a normal gain value. Chart 1015B illustrates the first microphone performance graph 1020B, which starts at maximum gain shortly after the application of water is stopped, and rapidly improves to a normal gain value. Chart 1025B illustrates the first microphone performance graph 1030B, which starts at maximum gain shortly after the application of water is stopped, and rapidly improves to a normal gain value. Chart 1035B illustrates the first microphone performance graph 1040B, which starts at maximum gain shortly after the application of water is stopped, and rapidly improves to a normal gain value.

FIG. 10C illustrates the peak attenuation to root-mean-square (RMS) level shift of the microphones during the water test. The ordinals of these graphs correspond to the attenuation in decibels (dB). Chart 1005C illustrates the first microphone performance graph 1010C, which starts at maximum attenuation shortly after the application of water is stopped, and rapidly improves to a normal attenuation value. Chart 1015C illustrates the first microphone performance graph 1020C, which starts at maximum attenuation shortly after the application of water is stopped, and rapidly improves to a normal attenuation value. Chart 1025C illustrates the first microphone performance graph 1030C, which starts at maximum attenuation shortly after the application of water is stopped, and rapidly improves to a normal attenuation value. Chart 1035C illustrates the first microphone performance graph 1040C, which starts at maximum attenuation shortly after the application of water is stopped, and rapidly improves to a normal attenuation value.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A grille configured for shielding a microphone cavity, the grille comprising:
   a first side having a first plurality of parallel slats defining a first plurality of channels extending along a first direction, each of the first plurality of channels having a first channel width extending along a direction perpendicular to the first direction; and
   a second side, opposite the first side, having a second plurality of parallel slats defining a second plurality of channels extending along a second direction at a first angle relative to the first direction, each of the second plurality of channels having a second channel width extending along a direction perpendicular to the second direction;
   wherein the first plurality of parallel slats and the second plurality of parallel slats define a lattice having a plurality of openings extending through the grille; and
   the first channel width and the second channel width are configured to induce capillary action when the grille comes into contact with water.

2. The grille of claim 1, wherein the plurality of openings is configured to diffuse air moving across the grille.

3. The grille of claim 1, wherein the first channel width is substantially equal to the second channel width.

4. The grille of claim 1, wherein the grille is formed of a hydrophilic material.

5. The grille of claim 1, wherein the first angle is 90 degrees.

6. The grille of claim 1, further comprising:
   a first portion; and
   a second portion;
   wherein
      the first portion includes the first side,
      the second portion includes the second side, and
      the first portion is coupled to the second portion.

7. The grille of claim 6, wherein the first portion is in a facing relationship to the second portion.

8. The grille of claim 1, wherein the first side and the second side are integrally formed as a unitary piece part.

9. The grille of claim 1, further comprising:
   a recessed opening configured to receive a fastener for facilitating attachment to a housing including the microphone cavity.

10. A remote speaker microphone housing comprising: a microphone cavity;
    a drainage cavity in fluid communication with the microphone cavity and an exterior of the remote speaker microphone housing; and
    a lattice positioned over the microphone cavity, the lattice including
    a first side having a first plurality of parallel slats defining a first plurality of channels extending along a first direction, each of the first plurality of channels having a first channel width extending along a direction perpendicular to the first direction; and
    a second side, opposite the first side, having a second plurality of parallel slats defining a second plurality of channels extending along a second direction at a first angle relative to the first direction, each of the second plurality of channels having a second channel width extending along a direction perpendicular to the second direction;
    wherein the first plurality of channels and the second plurality of channels form a plurality of openings configured to diffuse air moving across the lattice; and
    the first channel width and the second channel width are configured to induce capillary action on water coming in contact with the lattice.

11. The remote speaker microphone housing of claim 10, wherein
    the lattice is positionable with respect to the microphone cavity such that water drains from the microphone cavity to the drainage cavity.

12. The remote speaker microphone housing of claim 10, further comprising: a cover defining a third plurality of channels extending along a third direction parallel to the second direction.

13. The remote speaker microphone housing of claim 12, wherein the cover is positionable at a distance from the lattice, the distance configured to promote capillary action between the lattice and the cover.

14. The remote speaker microphone housing of claim 10, wherein the first angle is 90 degrees.

15. The remote speaker microphone housing of claim 10, wherein the first direction and the second direction are angled relative to a longitudinal axis of the housing.

16. The remote speaker microphone housing of claim 10, wherein the microphone cavity and the lattice are configured to have a resonant frequency greater than 8 KHz.

17. The remote speaker microphone housing of claim 10, the housing includes
    a second microphone cavity;
    a second drainage cavity in fluid communication with the second microphone cavity and the exterior of the housing; and
    a second lattice positioned over the second microphone cavity.

18. A communication device comprising:
    a microphone, and
    a housing including
       a microphone cavity;
       a drainage cavity in fluid communication with the microphone cavity and an exterior of the housing;
       a microphone port extending through the microphone cavity and configured to connect the microphone cavity to the microphone;
       a lattice positioned over the microphone cavity, the lattice including
          a first side having a first plurality of parallel slats defining a first plurality of channels extending along a first direction, each of the first plurality of channels having a first channel width extending along a direction perpendicular to the first direction; and
          a second side, opposite the first side, having a second plurality of parallel slats defining a second plurality of channels extending along a second direction at a first angle relative to the first direction, each of the second plurality of channels having a second channel width extending along a direction perpendicular to the second direction;
       wherein the first plurality of channels and the second plurality of channels form a plurality of openings configured to diffuse air moving across the lattice, and the first channel width and the second channel width are configured to induce capillary action on water coming in contact with the lattice, and the lattice is positionable with respect to the microphone cavity such that water drains from the microphone cavity to the drainage cavity.

19. The communication device of claim 18, further comprising:

a tray positioned between the lattice and the microphone cavity, forming an air buffer between the tray and the microphone port.

* * * * *